United States Patent
Schroader (10) Patent No.: US 10,166,575 B2
(45) Date of Patent: Jan. 1, 2019

(54) SHIFT AND HOLD CONVEYOR ASSEMBLY FOR REMOVAL OF OVERSIZE PARCELS

(71) Applicant: Fives Intralogistics Corp., Louisville, KY (US)

(72) Inventor: Steven Vann Schroader, Louisville, KY (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 15/330,185

(22) Filed: Aug. 20, 2016

(65) Prior Publication Data

US 2017/0120300 A1    May 4, 2017

Related U.S. Application Data

(63) Continuation of application No. 14/544,890, filed on Mar. 3, 2015, now Pat. No. 9,452,449.

(60) Provisional application No. 61/966,724, filed on Mar. 3, 2014.

(51) Int. Cl.
| B07C 5/00 | (2006.01) |
|---|---|
| B07C 1/14 | (2006.01) |
| B65G 13/00 | (2006.01) |
| B65G 15/00 | (2006.01) |

(52) U.S. Cl.
CPC ............. B07C 1/14 (2013.01); B65G 13/00 (2013.01); B65G 15/00 (2013.01)

(58) Field of Classification Search
CPC .................................... B07C 1/10; B07C 1/14
USPC ................................................ 209/659, 707
See application file for complete search history.

(56) References Cited

U.S. PATENT DOCUMENTS

| 3,354,360 | A | | 11/1967 | Campagna et al. | |
|---|---|---|---|---|---|
| 3,365,049 | A | * | 1/1968 | Raab | B65G 47/00 198/550.13 |
| 3,982,338 | A | * | 9/1976 | Dick | E02F 3/6445 37/463 |
| 4,396,048 | A | * | 8/1983 | Dubey | B27L 1/10 144/208.4 |
| 4,846,335 | A | | 7/1989 | Hartlepp | |
| 4,915,237 | A | | 4/1990 | Chang | |
| 5,165,520 | A | | 11/1992 | Herve et al. | |
| 5,222,586 | A | * | 6/1993 | Ydoate | B65G 47/256 198/443 |

(Continued)

*Primary Examiner* — Terrell H Matthews
(74) *Attorney, Agent, or Firm* — Carrithers Law Office, PLLC (57) ABSTRACT

A conveyor assembly insertable within a conveying system including a low friction conveying surface having both forward and lateral conveying forces for moving articles toward a parallel lateral sidewall and a downstream conveyor. A first diverging sidewall gradually converges parcels toward the center of the conveyor. An inwardly directed offset extends from a first diverging sidewall to a second lateral sidewall for shifting parcels inwardly toward a second lateral sidewall. A raised high friction conveying surface or rail belt extends along an outer edge of the low friction conveyor. At least a portion of the high friction belt is raised above the surface of the adjacent conveying surface in flow communication with the low friction conveying surface. Parcels contacting the high friction belt are prevented from shifting over toward the sidewall and parcels having a center of gravity outside the tipover point fall over the belt onto a recirculation conveyor.

24 Claims, 8 Drawing Sheets

(56) References Cited

U.S. PATENT DOCUMENTS

| | | | | |
|---|---|---|---|---|
| 5,701,989 A | * | 12/1997 | Boone | B65G 47/682 |
| | | | | 198/443 |
| 5,871,078 A | | 2/1999 | Amarson et al. | |
| 6,015,039 A | * | 1/2000 | Bonnet | B65G 47/49 |
| | | | | 198/360 |
| 6,401,936 B1 | * | 6/2002 | Isaacs | B65G 43/08 |
| | | | | 198/367.1 |
| 6,629,018 B2 | | 9/2003 | Mondie | |
| 6,729,453 B2 | | 5/2004 | Pfeiffer | |
| 6,751,524 B2 | | 6/2004 | Neary et al. | |
| 7,191,895 B2 | | 3/2007 | Zeitler et al. | |
| 7,413,071 B2 | | 8/2008 | Zeitler et al. | |
| 7,591,365 B2 | | 9/2009 | Knepple | |
| 7,631,747 B2 | | 12/2009 | Zeitler | |
| 8,061,506 B2 | | 11/2011 | Schafer | |
| 8,201,681 B2 | | 6/2012 | Schiesser | |
| 8,380,230 B2 | | 1/2013 | Rompe | |
| 8,408,380 B2 | | 4/2013 | Doane | |
| 2001/0035332 A1 | | 11/2001 | Zeitler | |
| 2002/0056607 A1 | * | 5/2002 | Bonnet | B65G 17/345 |
| | | | | 198/370.05 |
| 2003/0075416 A1 | * | 4/2003 | Prutu | B07C 1/10 |
| | | | | 198/370.1 |
| 2003/0141165 A1 | | 7/2003 | Reznik | |
| 2007/0246328 A1 | | 10/2007 | Reznik | |
| 2009/0250311 A1 | | 10/2009 | Honegger | |
| 2010/0012464 A1 | | 1/2010 | Schiesser | |
| 2011/0056798 A1 | | 3/2011 | Volk | |
| 2011/0214964 A1 | | 9/2011 | Zimmermann | |
| 2011/0215036 A1 | * | 9/2011 | Fourney | B65G 17/24 |
| | | | | 209/659 |
| 2011/0240439 A1 | | 10/2011 | Rompe | |
| 2013/0056329 A1 | | 3/2013 | Grootherder | |
| 2014/0121826 A1 | | 5/2014 | Kreitmeier et al. | |
| 2015/0122613 A1 | * | 5/2015 | Grant | B07C 1/00 |
| | | | | 198/443 |
| 2015/0259155 A1 | * | 9/2015 | Schroader | B65G 13/00 |
| | | | | 209/707 |
| 2016/0221762 A1 | * | 8/2016 | Schroader | B65G 43/08 |
| 2017/0320677 A1 | * | 11/2017 | Wiehler | B65G 47/681 |

* cited by examiner

SHIFT AND HOLD CONVEYOR ASSEMBLY FOR REMOVAL OF OVERSIZE PARCELS

CROSS REFERENCES TO RELATED APPLICATIONS

This is a Continuation application of U.S. Pat. No. 9,452,449 which issued on Sep. 27, 2016 from U.S. application Ser. No. 14/544,890 filed on Mar. 3, 2015 which claims priority from U.S. Provisional Application Ser. No. 61/966,724 filed on Mar. 3, 2014 both of which are incorporated by reference herein in their entirety.

TECHNICAL FIELD OF THE INVENTION

This invention relates generally to a shift and hold conveyor system for removal of oversized packages, parcels, and bags.

BACKGROUND OF THE INVENTION

The present invention relates to material handling and in particular to methods and apparatuses for conveying packages and a mechanism for controlling the location of packages on a conveyor.

Conventional conveyor systems convey large numbers of packages at high speed, especially in the parcel delivery industry wherein the packages are sorted according to the desired categories. The efficiency with which the packages are handled can be seriously diminished when a plurality of smaller packages, irregular sized or shaped items, or a mixture of oversized, large, and small articles pass together on the conveyors as a single unit.

Problems occur with scanning and separating packages and parcels which travel through the conveying system as an aggregate unit rather than in a single file and with oversize packages. Large packages hide small parcels and small side-by-side packages cause problems whenever they pass simultaneously through a scanner causing confusion and sorting problems. Moreover, packages such as bags or other flexible containers having the weight distributed unevenly, or where the width and length of the container are extreme, or where the container is soft or only partially full such as a floppy partially filled bag of mail tend to present sorting problems in that they do not move in predictable lateral patterns.

Typical conveyor systems for sorting parcels in typical applications comprise devices that take randomly arranged items and convert the random flow to a single file stream of items. The items are conveyed forward with both forward and lateral forces and aligned along one side. An ejector, ramp or other device can be placed after the aligned stream of items in order to remove items that did not make it all the way to the side wall on the aligned side to be separated laterally away from the primary stream of parcels. Typical configurations direct the laterally removed items and recirculate them back to the skewed roller section for another pass and opportunity to be aligned against the wall, to be passed through with the primary line of flow. Items are conveyed forward with both forward and lateral forces and aligned along one side.

Present technology works well for rigid parcels, like a box, but items that do not behave as a rigid item like flexible parcels or large bags containing several small items and oversized parcels are separated in accordance with their center of gravity and need to be removed from the parallel stream when the item is not aligned in single file.

Rearrangement of clusters of articles into a singulated single file is difficult to accomplish with packages having one dimension that is significantly greater than its other dimensions. If several packages having unequal loading, partially filled bags or boxes, or long and slender articles are conveyed side-by-side, conventional article singulation conveyors have difficulty separating side-by-side pairs into single file especially over a short distance and residence time. Occasionally instead of being positioned in single file, some of the packages may be conveyed abreast of one another, i.e., in side-by-side relationship traveling two abreast. The combined width of the two packages may present a problem at a downstream location in the conveyor system especially if one or both packages are oversize.

The need exists for a simple means of removing oversized items such as a shift and hold conveyor assembly for removal of oversized items which may be used as a module in a conveyor system or be used together with a singulator conveyor to organize packages having unequal weight, irregular dimensions, and off-set center of gravity.

SUMMARY OF THE INVENTION

The present invention comprises or consists of a shift and hold conveyor assembly for use with upstream and downstream conveyors for removal of oversize parcels. The shift and hold conveyor assembly is insertable at selected positions within the conveying system and can be an integral unit or can include a plurality of conveyors linked together. It includes at least one low friction conveying surface having both forward and lateral conveying forces such as a plurality of driven skewed rollers having rotary axes skewed relative to a longitudinal direction of travel for moving articles toward a parallel second lateral sidewall and a downstream conveyor. At a selected position, a first diverging sidewall gradually converges parcels toward the center of the conveyor against the lateral motion imparted by the skewed low friction rollers. An inwardly directed offset extends from the first diverging sidewall to the second lateral sidewall defining an offset for shifting parcels, packages, and bags inwardly toward the second lateral sidewall due to the forward and lateral forces of the low friction conveyor. Parcels conveyed on the outer portion of the low friction conveyor fall off of the end of the conveyor onto a take off ramp. Parcels which are biased against the first diverging sidewall are conveyed forward and parcels which are conveyed near the center of the conveyor are moved forward and engage a high friction conveying surface such as a conveyor belt.

A raised high friction conveying surface, such as a rail belt, extends along an outer edge, parallel to the low friction conveyor and forward direction of travel prior to the conveyor belt. At least a portion of the high friction belt is raised above the surface of the adjacent conveying surface in flow communication with the low friction conveying surface. Oversized parcels contacting the high friction belt are prevented from shifting over toward the second lateral sidewall so that packages having a center of gravity outside the tipover point fall over the belt onto a ramp extending from the outer edge of the rail belt and low friction conveying surface of the shift and hold conveyor assembly down to a recirculation conveyor.

More particularly, a shift and hold conveying apparatus for removing oversize parcels, comprising or consisting of a conveyor includes a low friction conveying surface for conveying parcels in a forward direction and a lateral direction. A first sidewall extends outwardly along an inward side edge of the conveyor at a selected position for a selected length. A second sidewall extends along an inward side edge of the conveyor at a selected position for a selected length downstream from at least a portion of the first sidewall. An offset extending from the first sidewall toward the second sidewall. A high friction belt of a selected width extends along an outer edge of the conveyor opposing the second sidewall and is raised a selected height above die surface of the low friction conveying surface and in flow communication therewith. The raised belt forms a tip-over threshold.

In one preferred embodiment, the high friction conveying surface has a least a portion raised above the level of the low friction conveying surface which may be adjacent to or in close proximity thereto. It is contemplated that a strip of material comprising a low friction conveyor or static surface may separate the high friction conveying surface and the low friction conveying surface which may comprise a conveying surface having a forward direction or more preferably a conveying surface having a forward and lateral direction such as driven skewed rollers having axes skewed relative to the longitudinal direction of travel for moving articles toward the second lateral sidewall.

A raised high friction conveying surface, such as a belt, extends along an outer edge, parallel to the low friction conveyor and forward direction of travel. At least a portion of the high friction belt is raised above the surface of the adjacent conveying surface in flow communication with the low friction conveying surface. Oversized parcels contacting the high friction belt are prevented from shifting over toward the second lateral sidewall packages having a center outside the tipover point fall over the belt onto a ramp extending from the outer edge of the shift and hold conveyor assembly down to a recirculation conveyor.

The raised high friction conveying surface or belt comprises a narrow belt which extends along an outer edge, parallel to the low friction conveyor and forward direction of travel. At least a portion of the high friction belt is raised above the surface of the adjacent conveying surface in flow communication with the low friction conveying surface. Raising the narrow belt disposed at or near the edge of the conveying surface creates a tip over threshold. Of course, the adjacent supporting surface or portion of the conveyor surface may be lowered with respect to the high friction belt to create a tip over threshold as well. Oversized parcels contacting and supported by the narrow high friction belt are moved forward and prevented from shifting over toward the second lateral sidewall. Packages having a center of gravity outside the tipover point fall off over the side of the narrow high friction belt and slide down to a recirculation conveyor or they are carried forward in a straight path where the width of the conveyor narrows so that the parcels or packages fall of the end of the conveyor onto a ramp and are removed from the conveying line. Packages which do not engage the high friction belt are conveyed downstream to a separation conveying assembly such as a singulator or side by side eliminator conveying surface.

A singulator conveyor can be used to remove the oversized parcels or side-by-side parcels having a surface engaging the high friction belt which resist lateral movement imparted by the skewed rollers toward the second lateral sidewall. A singulator conveyer has separation and orientation capabilities effective in separating side-by-side packages and parcels having unequal loading such as different sized packages (e.g., boxes, flats and softpacks), partially filled bags or boxes, or long and slender articles having an offset center of gravity into one or more rows of single file singulated articles over a short distance and residence time.

The parcels which are not biased against and/or aligned with the second lateral sidewall engage the high friction belt and are carried forward onto the conveying surface of the singulator or side by side eliminator, or singulator and then the side by side eliminator where any parcels which are wider than the threshold are removed from the flow do not pass through but tip over onto a ramp and slide down to a recirculation conveyor.

Thus, the shift and hold conveyor assembly can be combined with a downstream singulator to insure that two of more small items abreast of one another are separated while permitting large items to pass thorough the singulator even when the item is a large bag of small items. which may be used alone or in combination with singulators using a plurality of driven rollers or belts whose axes extend obliquely relative to the direction of conveyance to cause packages to be displaced laterally toward one side of the conveyor and become aligned behind one another.

The upstream conveyor has a greater width than each of the downstream conveyors, and the width of the side by side eliminator conveyor is less than one-half the width of the upstream conveyor. This tends to ensure that the downstream conveyor receives only packages arranged in single file and having a width less than the width of the downstream conveyor, in order to minimize the risk of jams occurring in downstream turns of the conveyor system. The singulator also includes a more narrow width that the upstream conveyor in order to remove packages which have a center of gravity extending over the outer edge. A ramp extends from the drop zone conveyor to a recirculation conveyor. A ramp may also be extended or added to the outer portion of the discharge end of the shift and hold conveyor and adjacent to the outer edge of the singulator or side by side eliminator conveyor which may be positioned in a series or separated by other conveying systems.

It is an object of the present invention to provide a shift and hold conveyor assembly having a low friction conveying surface providing forward and lateral force toward a sidewall and a high friction belt raised above the level of the adjacent conveyor to engage parcels, and impede the lateral movement of parcels in contact with the high friction belt wherein the parcels are conveyed forward and separated by weight or size.

It is an object of the present invention to provide a conveyor assembly having a first diverging sidewall which terminates in an inwardly extending step or offset connecting to a second lateral sidewall extending along the inner edge of the conveyor parallel thereto creating a shift region. A low friction surface including both forward and lateral conveying forces move articles inwardly toward a first diverging sidewall and a lateral side wall.

It is an object of the present invention to provide a driven conveyor lane surface including rollers having a low friction surface and rotary axes skewed relative to a longitudinal direction of travel so that the packages are conveyed simultaneously longitudinally forward and laterally inwardly toward a vertical side wall where incoming items are positioned there along at a selected speed.

It is an object of the present invention to provide a raised high friction belt extending along the lateral outer edge of the conveyor and the upper edge of the drop zone so that packages resting on the high friction belt and conveyor having a low friction surface will be prevented from making the shift toward the sidewall.

It is an object of the present invention to provide a high friction raised rail belt which runs at a selected speed greater, lower, or at the same speed as the vector speed of the rollers on the adjacent conveyor in the primary flow direction and is raised up above the roller surface up an effective distance to contact and hold packages resting on the belt and adjacent conveying surface.

It is on object of the present invention to provide a high friction raised belt which runs at a speed which matches the vector speed of the rollers on the adjacent conveyor in the primary flow direction and is raised up above the roller surface at an effective height for contacting and holding parcels in contact therewith. At least one preferred embodiment extends a selected height or distance of up to 5 inches, and more preferably up to 3 inches, and more preferably from ⅛ to 2 inches, more preferably from ½ to 2 inches and preferably about 1 and ½ inches to contact and hold packages resting on the belt and adjacent conveying surface.

It is an object of the present invention to insert the shift and hold conveyor assembly into a conveyor system as a unit which may be utilized together with a singulator, side by side eliminator, or other type of conveyor unit.

It is an object of the present invention to provide a high friction belt which is narrow enough to have an effective width enabling raising of the belt or lowering the conveying area around the belt creates a tipover threshold for packages having a portion extending over both sides of the belt.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is a perspective view of the shift and hold conveyor assembly module for removal of oversize parcels showing the second lateral sidewall and first diverging sidewall with the offset extending therebetween, the low friction conveying surface with driven skewed rollers exerting forward downstream force and lateral force inwardly toward the second lateral sidewall, the high friction raised belt extending along the outer edge of the portion of the conveyor downstream from the offset, a side by side eliminator conveyor downstream from the shift and hold conveyor assembly with a discharge ramp extending from the side in flow communication with parcels from the side by side eliminator and discharge portion of the shift and hold conveyor extending outwardly past the outer edge of the side by side eliminator;

FIG. 21 shows a perspective downstream end view of the shift and hold conveyor of FIG. 3 including the upstream conveyor providing input flow, forward conveying rollers having their rotary axes normal to the longitudinal direction of travel so that the packages are conveyed simultaneously longitudinally forward downstream and laterally inwardly toward a diverging sidewall to a thirty-six inch low friction conveyor with a raised high friction rail belt on an outside and an offset nine inch wide wall shift on the opposing side feeding a narrow twelve inch side by side eliminator conveyor providing a tipover threshold and a with take-off ramp whereby an article having a center wider than thirty-six inches will engage the high friction belt and drop off to a recirculation conveyor instead of making the shift toward the sidewall because the center of the article will be more than 6 inches to the left of the tipover threshold.

DETAILED DESCRIPTION OF THE PREFERRED EMBODIMENT

As shown in FIGS. 1-21, the present invention comprises or consists of a shift and hold conveyor assembly 10 for use with upstream and downstream conveyors for removal of oversize parcels. The shift and hold conveyor assembly 10 is insertable at selected positions within the conveying system and can be an integral unit or the unit can include a plurality of conveyors linked together.

Figure 1:
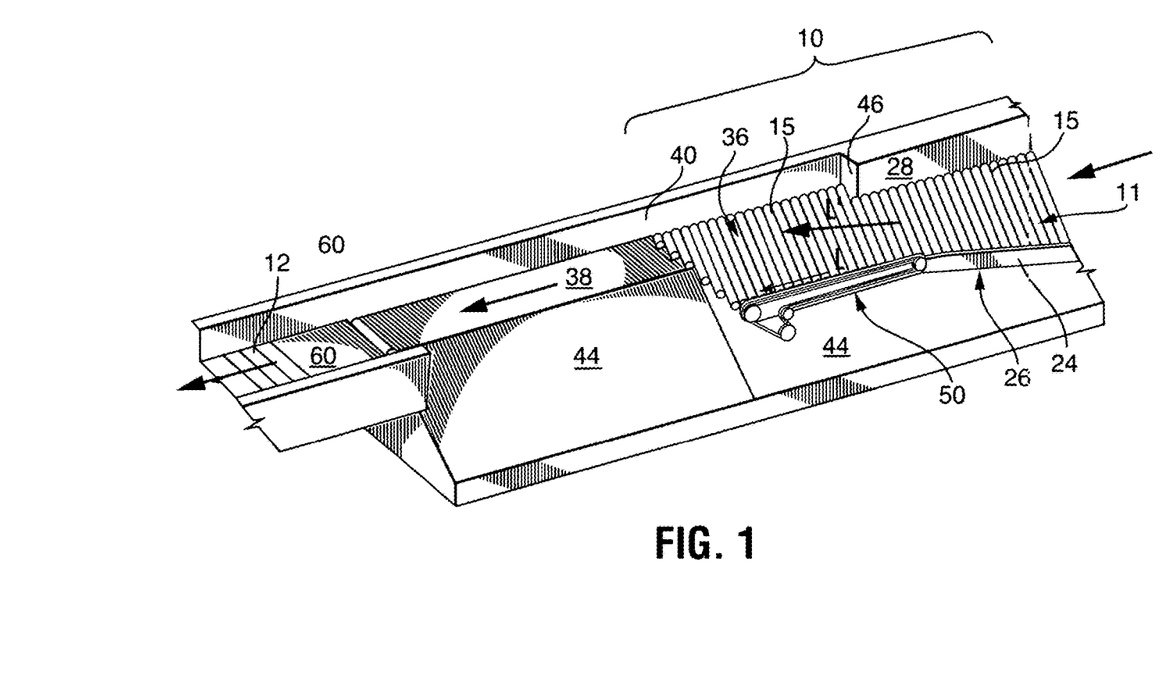
Figure 2:
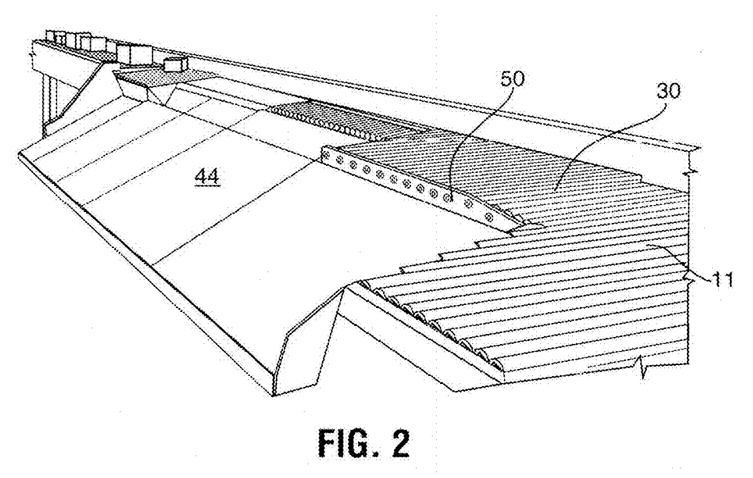
FIG. 2 shows a perspective downstream side view of the shift and hold conveyor assembly including the upstream conveyor, offset wide wall shift, conveyor with raised high friction rail belt, side by side eliminator conveyor with take off ramp and recirculation conveyor.

For instance, as shown in FIG. 1, the shift and hold assembly or module 10 is comprised of an integral unit whereby the conveyor surface is continuous and comprise a series of driven rollers 11. Conveyors upstream or downstream or even the feed portion or other selected portion of the shift and hold assembly 10 may comprises endless conveyor belts comprised of forward conveying rollers 12 having their rotary axes normal to the longitudinal direction of travel. At least a selected portion or sections of the shift and hold conveyor 10 adjacent a divergent sidewall 28 and downstream second lateral sidewall 40 are skewed relative to a longitudinal direction of travel so that the packages are conveyed simultaneously longitudinally forward L downstream and laterally inwardly L' toward a first diverging sidewall 28. The skewed rollers 15 comprise a series of driven rollers having rotary axes skewed relative to a longitudinal direction of travel so that the packages are conveyed simultaneously longitudinally forward and laterally outwardly.

The high friction conveyor(s) comprise conveying surfaces of solid or mesh belts comprising rubber, elastomers, polymers, and combinations thereof providing a high friction material as compared with the low friction conveying surface. The high friction conveying surface may also comprise rollers having at least a portion thereof covered or coated with a high friction surface such as a rubber, plastic, elastomer or other polymeric material including sleeves or bands composed of same. The low friction conveyor, conveying surface or conveying lane is comprised of a lower friction material such as metal including aluminum, stainless steel, steel, TEFLON, NYLON, graphite, or other polymeric material including sleeves or bands composed of same which comprises a low friction material when compared to the high friction conveying surface. The low friction convey surface may be formed by using a plastic modular belting, containing driven rollers, a belt, or a belt and/or rollers coated with a low friction coating.

At a selected position, a first diverging sidewall 28 gradually extends outwardly from a second lateral sidewall 40 extending along the inward edge of the conveying surface. The diverging sidewall diverts, aligns, and forces the parcels toward the center of the conveyor against the lateral and forward motion imparted by the skewed low friction rollers. The lateral forces imposed by the skewed rollers 15 of the low friction conveying surface force the parcels against the first diverging sidewall which separates, aligns, and biases the parcels and packages on the low friction conveyor against the first diverging sidewall. An inwardly directed offset 42 extends from the first diverging sidewall 28 at a selected angle to the second lateral sidewall 40 to narrow the width of the conveying surface, shift parcels, packages, and bags moving forward against the first diverging sidewall 28 inwardly toward the second lateral sidewall 40 due to the forward and lateral forces of the low friction conveyor. The first diverging sidewall 28 also diverts or conveys large oversize parcels toward the center of the conveyor which is about 36 inches wide at the point of the offset 42 where the first diverging sidewall connects to the second lateral sidewall 40. In one preferred embodiment, the first diverging sidewall 28 is offset approximately 9 inches inwardly from the second lateral sidewall 40. It is contemplated that the first diverging sidewall 28 can overlap or start in close proximity to the distal end of the second lateral sidewall 40 or be an extension thereof.

At a selected point opposite the first diverging sidewall 28 near the offset 42, an outward converging edge portion 24 of the shift and hold conveyor 10 converges inwardly toward the preselected width of about 36 inches at, or prior to, the termination of the first diverging sidewall 28 forming a throat for aligning packages near the center of the conveyor 10.

Parcels biased against the first diverging sidewall 40 are conveyed forward. Parcels conveyed near the center of the conveyor are moved forward and engage a high friction conveying surface disposed along the outer edge of the conveying surface. The high friction conveying surface has at least a portion thereof raised above the level of the low friction conveying surface and is in flow communication therewith so that parcels resting on the high friction conveying surface have at least a portion thereof resting on the low friction conveying surface. Preferably the low friction conveying surface comprises a conveying surface having a forward direction and/or a conveying surface having a forward and lateral direction such as driven skewed rollers having axes skewed relative to the longitudinal direction of travel for moving articles toward the second lateral sidewall and away from the high friction conveying surface.

In at least one preferred embodiment, the high friction conveying surface comprises a narrow high friction raised rail belt 50, such as a V belt having an effective width for holding packages or parcels which are conveyed onto the belt to hold the parcels resting on the belt and low friction conveying surface forward preventing lateral movement toward the second lateral sidewall 40. The belt may have a convex or flat surface and have an effective width up to several inches wide so long as the outer surface of the belt is of a shaped providing a tip over point for parcels resting thereon. The belt 50 extends along the horizontal outer leading edge of the shift and hold conveyor 10 for preventing oversized items resting on or engaging the belt from making the shaft over inwardly to the lateral side wall 40. In one preferred embodiment, the belt runs at a speed which matches the vector speed of the rollers in the primary flow direction. The rail belt 50 is raised up above the low friction conveyor surface "roller surface" about 1½ inches. it is contemplated that the effective height of the belt above the low friction conveying surface can be from 0.1 of to 3 inches in height and more preferably about 0.5 to 2 inches above the roller surface and more preferably 1 to 1.5 inches above the roller conveying surface.

The high friction rail belt 50 disposed adjacent and slightly above the outer edge 24 of the conveyor 10 prevents oversized items engaging the high friction belt 50 from shifting over toward the second lateral sidewall 40 and accelerates the discharge of the packages resting partially on the low friction conveying surface 11 and partially on the rail belt 50 having a center outside the tip-over point. The items below the threshold which do not contact the high friction belt 50 may shift over toward the second lateral sidewall 40 and are inside of the tipover point and therefore pass over the conveyor 10.

The shift and hold conveyor assembly 10 embodiment illustrated in the drawings comprises a low friction conveying surf re including a plurality of skewed rollers which impart forward and lateral forces inwardly toward the first diverging sidewall 28 and the downstream second lateral sidewall 40. However, it is contemplated that portions of the conveyor 10 may include a low friction conveying surface comprising sections of forward conveying rollers so long as an effective amount of low friction conveying surface is available to provide a forward and lateral force toward the sidewalls prior to and opposite the rail belt. It is also contemplated that a strip of static material could be disposed between the rail belt and low friction conveying surface and/or sidewalls 28, 40, and that the oversized parcels would still be removed so long as a portion of the parcel rested upon the rail belt and a low friction surface allowing forward movement of the parcel by the rail belt.

Figure 4:
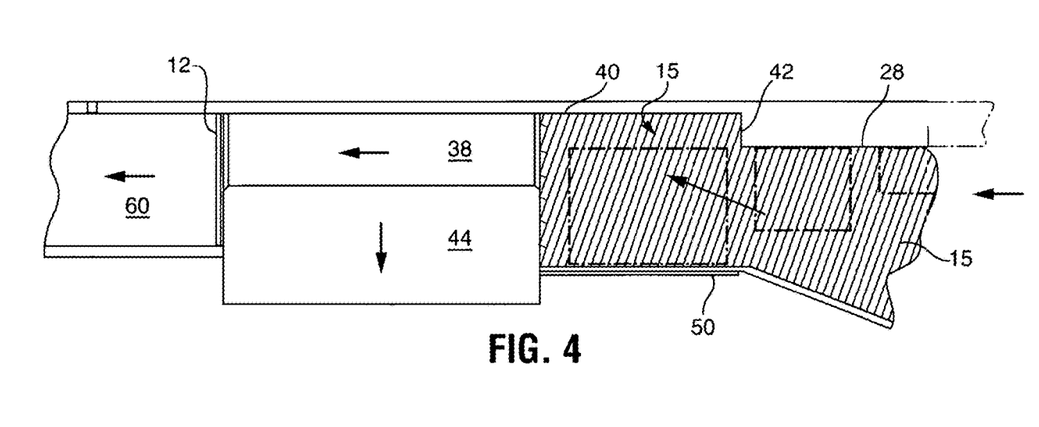
FIG. 4 shows the shift and hold conveyor assembly including packages of various sizes positioned via the offset sidewall wherein the larger packages which engage a high friction belt which prevents them from making a shift toward the side whereby the oversized items tipover and onto a ramp.
Figure 5:
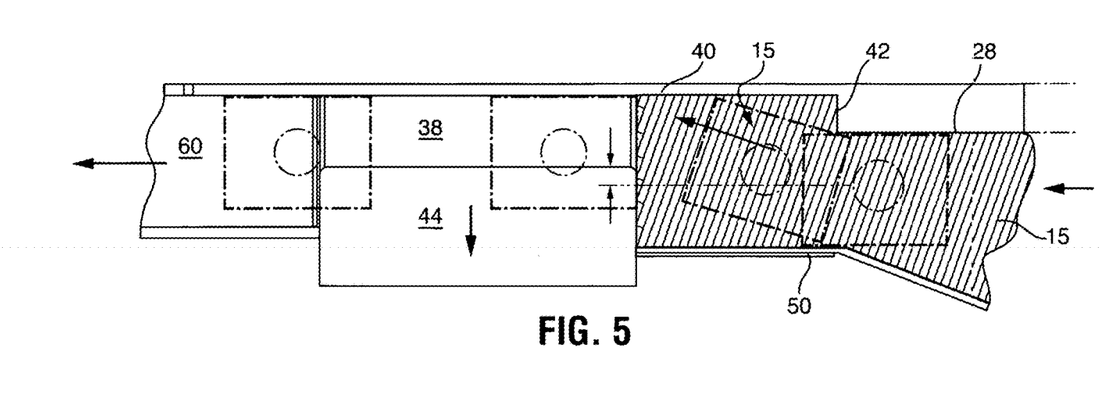
FIG. 5 shows the shift and hold conveyor assembly including packages, parcels, or articles of various sizes positioned via the offset sidewall wherein the larger packages which do not extend over to and engage a high friction belt shaft via low friction skewed rollers over against the side wall onto a side by side eliminator or drop off zone conveyor whereby oversized items tipover onto the take off ramp.

As shown in FIG. 4, packages of various sizes are positioned via the offset sidewall wherein the larger packages engage a high friction rail belt 50 which prevents them from making a shift toward the side whereby the oversized items tipover and onto a ramp;

As shown in FIG. 5, an oversized article is positioned via the offset sidewall wherein the package does not extend over to touch and engage the raised high friction rail belt 50 but is biased and conveyed via low friction skewed rollers 15 over against the first diverging side wall 28 past the first tipover point 210 contacting the set off 42 and moving via the low friction skewed conveyors 15 toward the second lateral side wall 40 onto a side by side eliminator 38 or singulator 111 past the second tip off point 212 and the drop off zone conveyor or chute 44. Both the side by side eliminator 38 and singulator include low friction conveying means such as skewed rollers disposed between a pair of high friction conveying means such as belts. The skewed rollers of the side by side eliminator 38 and singulator 111 bias articles away from the first diverging sidewall 40. The items below the threshold make the shift and the center of the item is well inside of the tipover point and therefor pass over the side by side eliminator device or singulator 38. Thus, the oversized items which do not engage the high friction belt 50 are conveyed over a singulator, side by side eliminator device, or combination thereof align and separate the parcels whereby side by side parcels or parcels larger than a selected width drop off of the side of the conveyor onto a ramp 44 for recirculation. Since the downstream portion 36 of the shift and hold conveyor 10 as shown in the figures is 36 inches in width, any packages having a center wider than 36 inches will engage the high friction belt 50 and not make the shift over to the side wall 40. The nine inch shift due to the offset will result in the center of the package being more than six inches to the left of the tipover threshold and the package or parcel will tipover and fall onto a ramp leading to a recirculation conveyor 46. Thus, individual oversized items that are passing that are wider than the 36 inch width will engage the high friction rail belt and not shift towards the side wall are will be removed from the flow.

Figure 6:
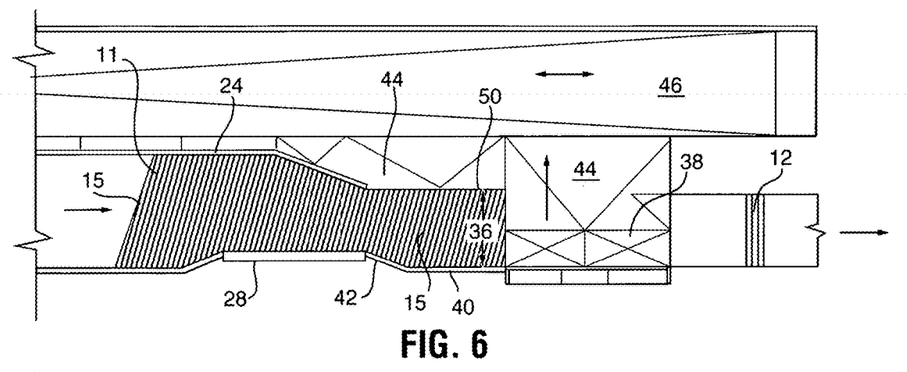
FIG. 6 shows the shift and hold oversize item removal assembly wherein packages are conveyed downstream via an upstream conveyor including an offset sidewall, a conveyor including a high friction raised belt along the outer edge of the conveyor and a side by side eliminator conveyor transferring packages to a downstream conveyor.
Figure 7:
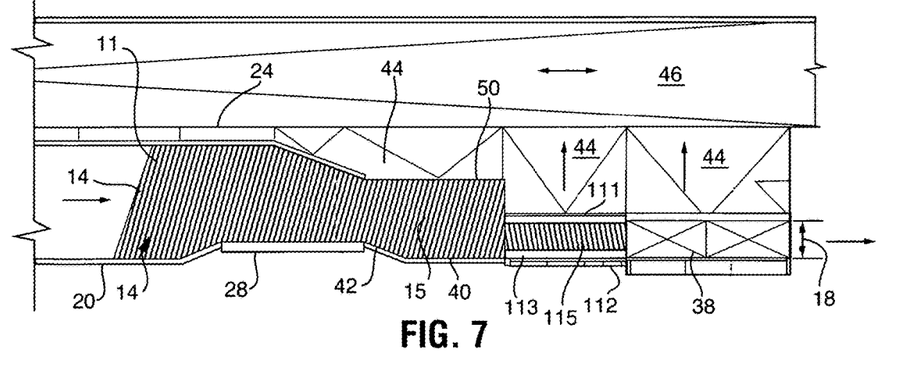
FIG. 7 shows the shift and hold oversize item removal assembly wherein packages are conveyed downstream via an upstream conveyor including an offset sidewall, a conveyor including a high friction raised belt along the outer edge of the conveyor, a downstream singulator conveyor system, and a side by side eliminator conveyor transferring packages to a downstream conveyor.
Figure 8:
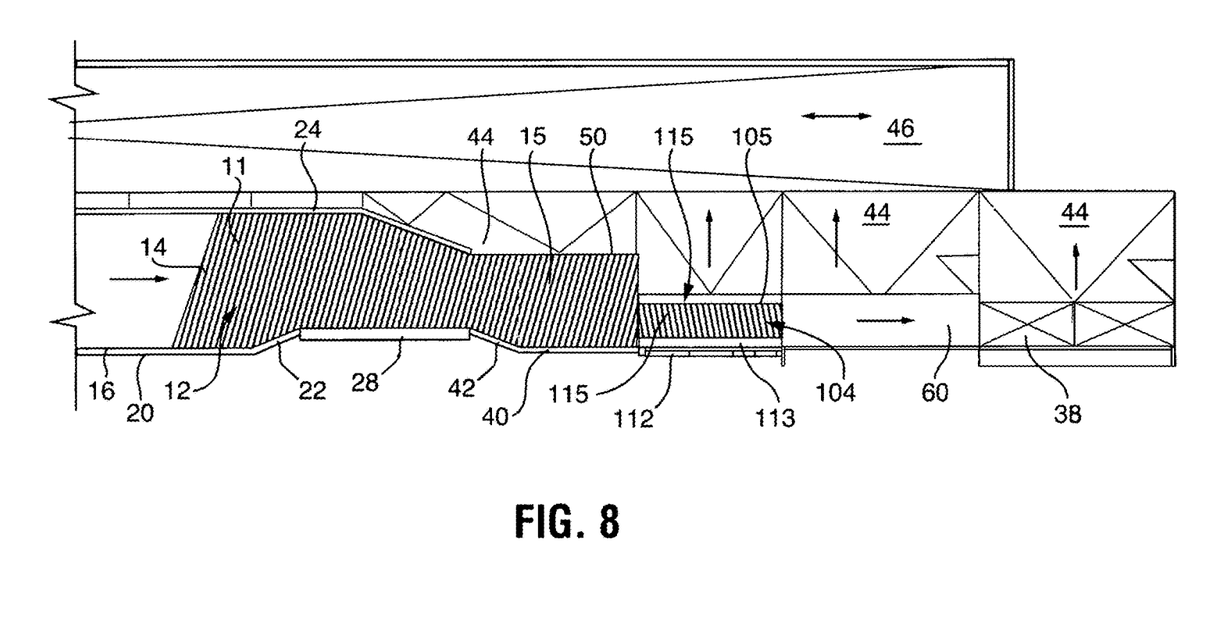
FIG. 8 shows the shift and hold oversize item removal assembly wherein packages are conveyed downstream via an upstream conveyor including an offset sidewall, a conveyor including a high friction raised belt along the outer edge of the conveyor, a downstream conveyor, a singulator conveyor system, and a side by side eliminator conveyor transferring packages to a downstream conveyor.
Figure 9:
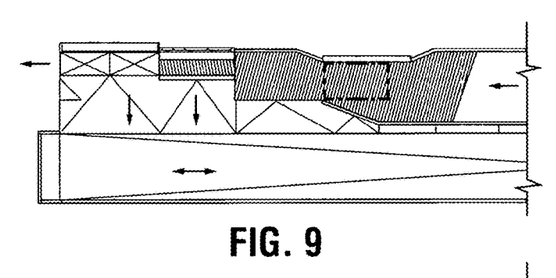
FIG. 9 is a top plan view of the shift and hold conveyor assembly showing a parcel positioned along the first diverging sidewall supported by the low friction conveyor wherein the parcel has a width below the threshold shift over for which does not contact the high friction conveyor and is conveyed through the conveyor system.
Figure 10:
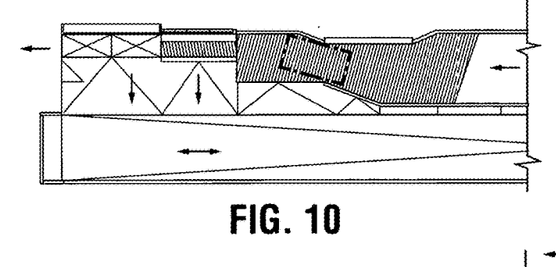
FIG. 10 is a top plan view of the shift and hold conveyor assembly showing a parcel positioned along the transition region between the first diverging sidewall and second lateral sidewall supported by the low friction conveyor wherein the parcel has a width below the threshold shift over for which does not contact the high friction conveyor and is conveyed through the conveyor system.
Figure 11:
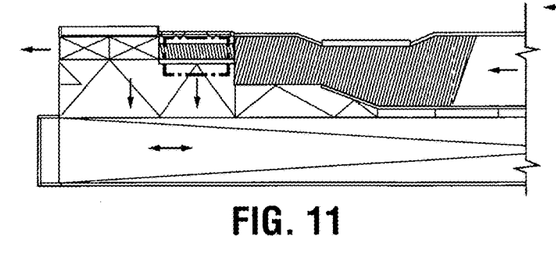
FIG. 11 is a top plan view of the shift and hold conveyor assembly showing a parcel positioned on a singulator conveyor having a ramp extending to a drop zone and onto a recirculation conveyor wherein the parcel has a width below the threshold shift over and is conveyed through the conveyor system.
Figure 12:
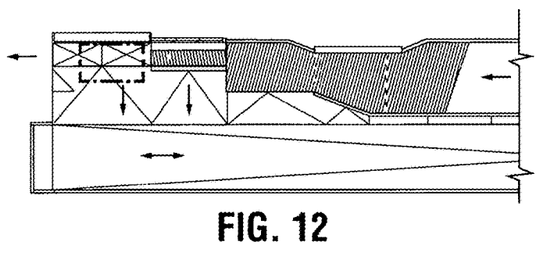
FIG. 12 is a top plan view of the shift and hold conveyor assembly showing a parcel which has passed through the singulator conveyor and onto a side by side eliminator conveyor having a ramp extending to a drop zone and onto a recirculation conveyor wherein the parcel has a width below the threshold shift over and is conveyed through the conveyor system.
Figure 13:
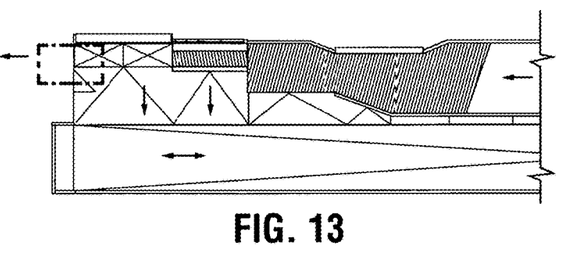
FIG. 13 is a top plan view of the shift and hold conveyor assembly showing a parcel which has passed through the singulator conveyor and side by side eliminator conveyor wherein the parcel has a width below the threshold shift over parameters and is conveyed through the conveyor system.
Figure 14:
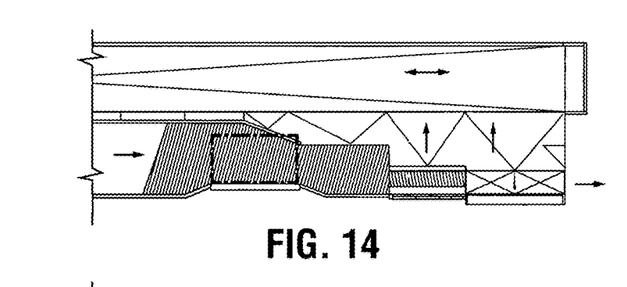
FIG. 14 is a top plan view of the shift and hold conveyor assembly showing a parcel positioned along the first diverging sidewall supported by the low friction conveyor wherein the parcel has a width above the threshold shift over which contacts the high friction conveyor.
Figure 15:
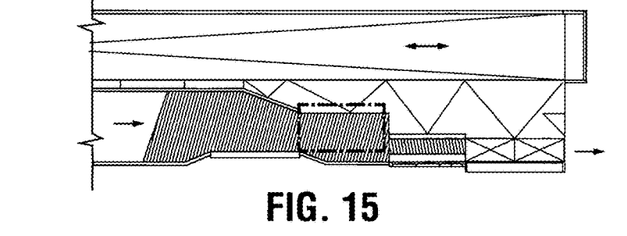
FIG. 15 is a top plan view of the shift and hold conveyor assembly showing a parcel positioned between the second lateral sidewall supported by the low friction conveyor wherein the parcel has a width above the threshold shift-over which contacts the high friction rail belt conveyor which prevents inward lateral movement of the parcel and provides forward conveyance thereof.
Figure 16:
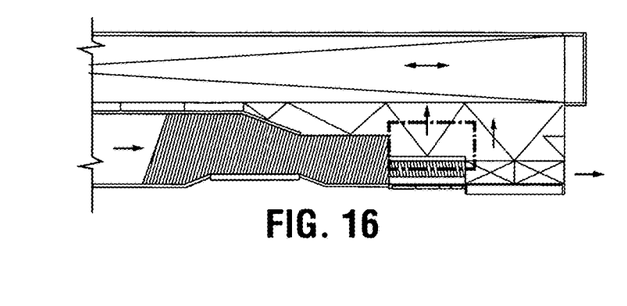
FIG. 16 is a top plan view of the shift and hold conveyor assembly showing a parcel which has discharged from the high friction belt of the shift and hold conveyor and conveyed onto a singulator conveyor having a ramp extending to a drop zone and onto a recirculation conveyor wherein the parcel has a width below the threshold shift over and will tip over onto the ramp.
Figure 17:
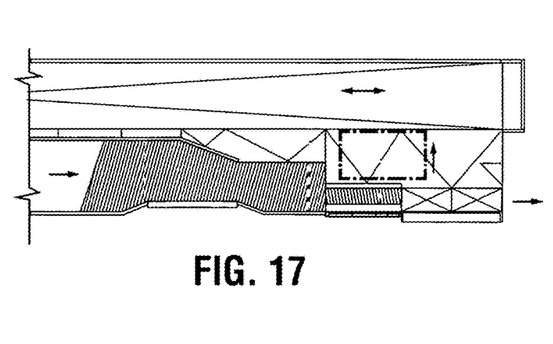
FIG. 17 is a top plan view of the shift and hold conveyor assembly showing a parcel which has passed through the singulator conveyor which has tipped over because the parcel has a width above the threshold limit and slides down a ramp extending to a drop zone.
Figure 18:
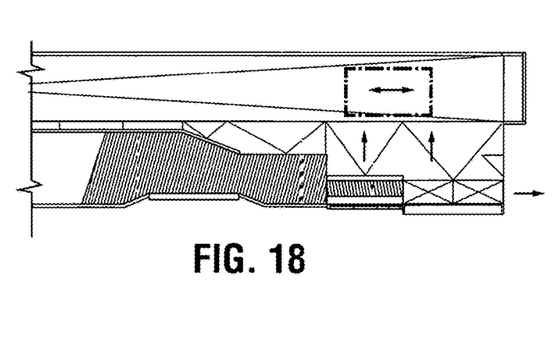
FIG. 18 is a top plan view of the shift and hold conveyor assembly showing a parcel which has passed through the shift and hold conveyor assembly and onto the singulator conveyor before being tipped over because the parcel has a width above the threshold limit and slides down a ramp extending to a drop zone and onto a recirculation conveyor.
Figure 19:
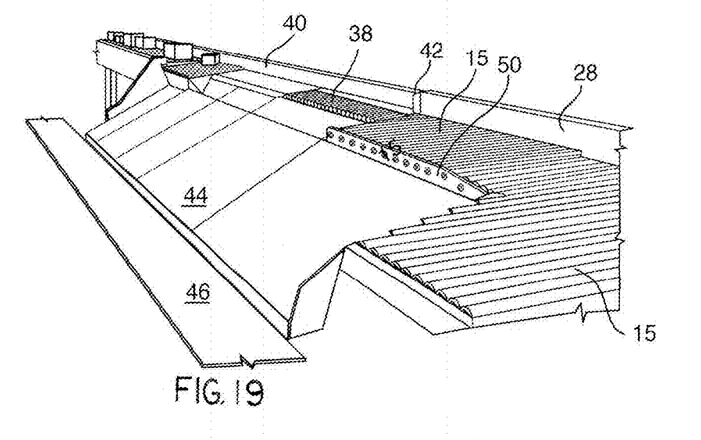
FIG. 19 is a perspective view of the shift and hold conveyor assembly of FIG. 2 looking downstream showing the offset wide wall shift, forward conveying rollers having their rotary axes normal to the longitudinal direction of travel so that the packages are conveyed simultaneously longitudinally forward downstream and laterally inwardly toward a diverging sidewall, a raised high friction rail belt adjacent a 36 inch low friction conveyor, and side by side eliminator conveyor with take off ramp downstream therefrom.
Figure 20:
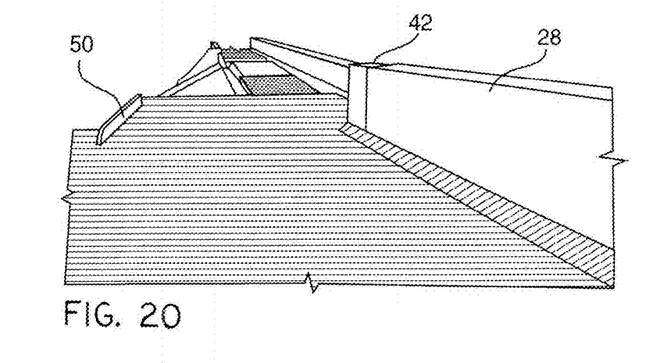
FIG. 20 is a downstream view of the raised high friction belt opposite the side wall shift.
Figure 21:
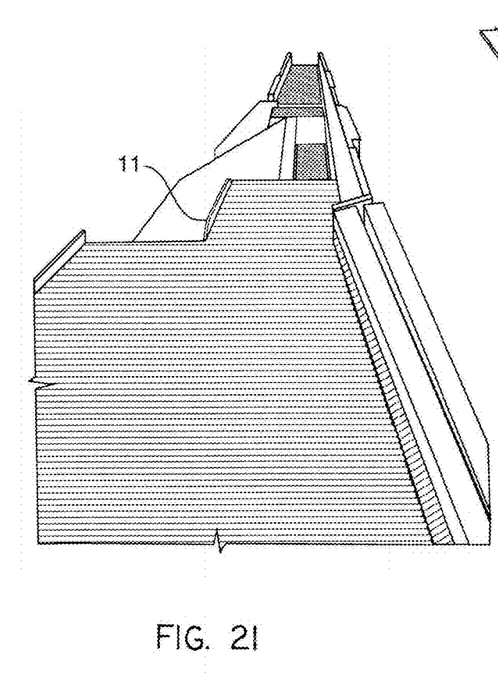

As best illustrated in FIG. 6, oversize items or packages conveyed via the shift and hold conveyor assembly that has evenly distributed weight that engages the high friction rail belt at the 36 inch threshold will tipover and fall off onto the recirculation conveyor, while packages having a width of less than 36 inches pass through to the side by side eliminator conveyor 38 or singulator 111. As shown in FIG. 7, the conveyor assembly includes a singulator 111 positioned upstream from a side by side eliminator 38. It is also contemplated that driven conveyors utilizing belts and/or forward motion and/or skewed rollers and combinations thereof maybe disposed between the singulator conveyor assembly or the side by side eliminator 38 device as illustrated in FIG. 8 which includes downstream conveyor 60.

FIGS. 9-13 illustrate sequentially how a package moves through the shift and hold conveyor assembly. The parcel is positioned along the first diverging sidewall supported by the low friction conveyor wherein the parcel has a width below the threshold shift over for which does not contact the high friction conveyor and is conveyed through the conveyor system. The parcel moves along the transition region between the first diverging sidewall and second lateral sidewall supported by the low friction conveyor wherein the parcel has a width below the threshold shift over for which does not contact the high friction conveyor and is conveyed through the conveyor system. The parcel moves through a singulator conveyor having a ramp extending to a drop zone and onto a recirculation conveyor wherein the parcel has a width below the threshold shift over and is conveyed through the conveyor system. After the parcel has passed through the singulator conveyor, it moves onto a side by side eliminator conveyor having a ramp extending to a drop zone and onto a recirculation conveyor. Because the parcel has a width below the threshold shift over it is conveyed through the conveyor system.

FIGS. 14-18 illustrate sequentially how a package is selectively discharged through the shift and hold conveyor assembly. The parcel moves along the lateral sidewall toward the offset and diverging sidewall supported by the low friction conveyor. The parcel has a width above the threshold shift over which contacts the high friction rail belt which prevents inward lateral movement of the parcel and provides forward conveyance thereof. The parcel is discharged from the high friction rail belt and low friction roller conveyor onto a singulator or side by side conveyor having a ramp extending to a drop zone and onto a recirculation conveyor. The parcel has a width below the threshold shift-over and will tip over onto the ramp because the parcel has a width above the threshold limit and slides down a ramp extending to a drop zone and onto a recirculation conveyor.

As described heretofore, the shift and hold conveyor assembly combines a conveyor having a low friction conveying surface with lateral and forward conveying surfaces forcing parcels inwardly toward a first diverging sidewall connecting to a second lateral sidewall 40 by an offset, and a narrow raised high friction rail belt extending along the outer edge of the conveyor.

Oversize parcels conveyed along the outer portion of the low friction conveyor engaging the high friction belt will fall off of the end of the conveyor onto a take off ramp. Parcels which do not touch the belt and are positioned inwardly thereof are biased toward the second lateral sidewall 40 and are conveyed downstream.

Figure 3:
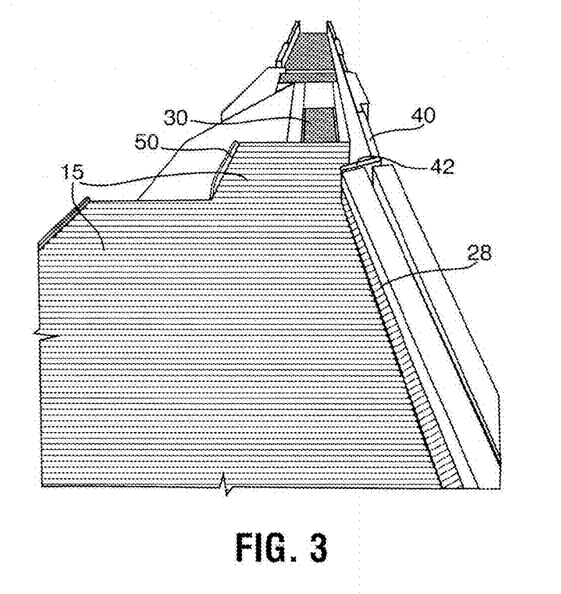
FIG. 3 shows a perspective downstream end view of the shift and hold conveyor including the upstream conveyor, 9 inch offset wide wall shift, 36 inch low friction conveyor with high friction rail belt, and 12 inch side by side eliminator conveyor with take off ramp and recirculation conveyor wherein the articles flow from the upstream conveyor toward a 36 inch low friction convey having the high friction rail belt disposed along the outer sidewall so that items having a center wider than 36 inches will engage the high friction rail belt and will not make the shift toward the sidewall resulting in the center of the article being more than 6 inches to the left of the tipover threshold.

In one preferred embodiment, the packages moving pass the shift and hold conveyor assembly 10, move along the second lateral sidewall 40 of the conveyor and feed the side by side eliminator conveyor 38 which is typically less than half of the width of the 36 inch wide conveyor, usually from 18-21 inches in width and preferably 12 inches wide a shown in FIG. 3. The side by side eliminator conveyor may include a low friction surface comprising a belt or a series of driven rollers 11 whose rotary axes normal to the direction of flow or they may be driven skewed rollers 15 relative to a longitudinal direction of travel. If the rollers are skewed the packages are conveyed simultaneously longitudinally forward and laterally inward toward a third side wall.

A drop off zone or ramp 44 is situated adjacent the outer edge of the side by side eliminator conveyor 38 surface for receiving packages which fall therefrom and convey the packages to a recirculation conveyor 56.

Use of the side by side eliminator or singulator with the present invention provides upstream, and downstream conveying surfaces which are arranged in alignment for sequentially conveying packages. U.S. Pat. No. 5,222,586 which is incorporated by reference herein, describes a device wherein each of the conveying surfaces has a width measured from a reference line to an outer edge of the respective conveying surface. The width of the conveying surface is less than the width of the upstream conveying surface. The width of the downstream conveying surface is less than the width of the upstream conveying surface and greater than two times the width of the conveying surface. The packages are conveyed sequentially along the upstream, and downstream conveying surfaces, with inner edges of the packages traveling along the reference line. Packages traveling abreast, and packages having a width greater than the downstream conveying surface, tend to fall from the outer edge of the conveying surface.

The width of the upstream conveyor is greater than the width of the shift and hold conveyor 10 and the downstream side by side eliminator conveyor width which is typically less than one-half of the upstream conveyor width so that the downstream conveying surface tends to receive only packages which are arranged in single file and which are of a width less that the conveyor width.

A single package may be of such a large width that it might jam in the downstream turns. Side by side packages or the excessively wide package that might jam downstream conveyance are removed where the width of the upstream conveyor is larger than each of the widths of the downstream and conveyors, and wherein the width of the second conveyor is less than one-half of the width of the upstream conveyor.

For example, if two packages traveling abreast, the outer package farthest from the side wall will have its center of gravity situated outside of the outer edge of the conveyor and will fall off that conveyor into a ramp in the drop-off zone. The ramp is situated in the drop-off zone to guide the package when it falls off the conveyor. The discharged package can then be recirculated onto the conveyor system. Alternatively, the packages can fall onto another conveyor which can transport the packages to a suitable location. The exceptionally wide package having a width greater than the width of the downstream conveyor, will have a center of gravity situated outside of the edge of the conveyor. In such case, the package will fall down the ramp.

It may also occur that the exceptionally wide package may have the weight of its contents distributed unevenly, such that the center of gravity of the package is disposed inwardly of the outer edge of the conveyor. That package would not ordinarily drop off of the edge; however, the high friction belt 50 adjacent the outward edge of the conveyor will hold the package preventing the package from shifting back to the side wall. The package will drop off of the conveyor onto the drop zone for recirculation.

In another preferred embodiment, the side by side conveyor 38 may comprise a singulator conveyor system or assembly 111 which may be inserted in place of or prior to a side-by-side eliminator 38. As shown in the figures, a singulator assembly 111 includes first conveyor 113 including rollers or preferably a generally flat belt having a high friction surface for conveying articles along a vertical side wall 112 where incoming items are positioned therealong, a second low friction conveyor 104 which may use skewed drive rollers 115, and a third high friction belt conveyor 105. Packages resting against the vertical side-wall 112 and resting on the first conveyor 113 will proceed across the conveyor to the down stream conveyor which may comprise a drop off zone conveyor which is from 18-21 inches in width and typically less than half of the width of the 36 inch wide conveyor. The support surface of the drop off zone conveyor may include a low friction surface comprising a series of driven rollers 14 whose rotary axes normal to the direction of flow or they may be driven skewed rollers 15 relative to a longitudinal direction of travel. If the rollers are skewed the packages are conveyed simultaneously longitudinally forward and laterally inward toward the side wall.

More particularly, a typical singulator conveyor such as described in U.S. Pat. No. 5,701,989 incorporated by reference herein, describes a singulator which includes or at least two and preferably three parallel conveyors or conveying surfaces in flow communication with one another and usually adjacent one another. It is contemplated that static or stationary conveying surfaces comprise strips disposed between the conveying surfaces. U.S. application Ser. No. 14/121,829 incorporated by reference herein, also describes a singulator comprising three parallel adjacent conveyors, the first conveyor includes a low friction surface traveling in a forward direction and lateral direction away from the first conveyor and toward the third conveyor. The edge of the second conveyor is disposed below the first conveyor and forms an inclined plane angled upward from the first conveyor toward the third conveyor but slightly above the plane of the third conveyor. In this manner, when a package travels along having a portion resting on the first and second conveyor, the package will tend to be pulled forward. Packages will tend to move from the second conveyor toward the third conveyor along the inclined plane. Moreover, packages resting on the second conveyor and third conveyor will be dragged onto the third high friction conveyor to a position where the center of gravity is over the third conveyor and supported thereon. It is contemplated that the speed of the first conveyor having a high friction surface may be increased with respect to the second conveyor which will tend to arrange packages in a single file because the package adjacent the side wall will move ahead of the package resting on the second conveyor or (first and second conveyor) as both are urged in the direction of travel. Because this feature of the invention provides for positioning and aligning packages based upon contact with any portion of the package or article, the singulator removes side-by-side packages which have a package dimension which may be transverse to the direction of travel of the conveying surface by operating on the transverse width of the package as well as the center of gravity of the package. Even when the load is not distributed uniformly such as a partially filled bag, the bag will be moved and positioned onto the first or second conveyor depending upon the center of gravity of the package. Packages resting on both the second and third conveyors having a lateral dimension transverse to the direction of travel of the conveying surface will be pulled onto the third conveyor.

It is also contemplated that a discharge accelerator may be provided to assist in removal of the packages from the shift and hold conveyor 10, side by side eliminator 38, and/or singulator 111; however, it is typically not necessary. The discharge accelerator comprises a roller which is driven in a direction tending to frictionally displace a falling package downwardly. The roller is rotated about an axis extending parallel to the reference line defined by the wall by means of a motor. In order to ensure that the packages do not engage the roller unless they are actually falling from the conveyor, the roller is disposed at a lower elevation than the conveying surface of the conveyor. In lieu of a roller, the discharge accelerator could comprise other types of driven devices, such as a belt conveyor for example.

Method of Use:

The method for separating and removing oversized parcels with the shift and hold conveyor comprises the steps of conveying parcels on a low friction conveying surface in a forward direction and a lateral direction toward a first sidewall and aligning the parcels. The parcels contact the first sidewall and the first sidewall diverts the parcels inwardly toward a center portion of the conveyor a selected distance against the forward direction and the lateral direction of the low friction conveying surface establishing a threshold for separation of the parcels. The parcels are conveyed on the low friction conveying surface in a forward direction and a lateral direction downstream toward a second sidewall offset outwardly with respect to a center of the conveyor and inwardly with respect to the first sidewall shifting the parcels having a width below the threshold against the second sidewall for conveying downstream. The parcels having a width above the threshold are conveyed onto a raised high friction conveying surface in flow communication therewith having a tip-over threshold and extending along a side edge of the conveyor at a position generally opposite the second sidewall and spaced apart therefrom a selected distance. The parcels having a width above the threshold and having at least a portion thereof resting on the high friction conveying surface are held away from the second sidewall and conveying the parcels downstream. The parcels remaining on the raised high friction conveying surface are removed from the primary downstream flow adjacent the second sidewall.

Parcels engaging the raised high friction conveying surface onto a side ramp are tipped over and discharged from the side of the conveyor or discharged from an outward distal end portion of the conveyor. The process may also include the step of conveying parcels having a width below the threshold and passing through the threshold onto a side by side eliminator conveyor in flow communication with the low friction conveying surface thereof. Alternatively, the step of removing oversize parcels having a width below the threshold and pass through the threshold onto a singulator conveyor in flow communication with the low friction conveying surface thereof. The process may also include the step of conveying parcels having a width below the threshold and passing through the threshold onto singulator conveyor in flow communication with the low friction conveying surface and conveying the parcels passing through the singulator conveyor to a side by side eliminator conveyor in flow communication therewith.

Parcels above a threshold limit of the side by side eliminator are removed by tipping the parcels over onto a ramp extending from an outer edge of the side by side eliminator conveyor, and/or singulator.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

The invention claimed is:

1. A method of shifting, holding and removing articles from a conveying apparatus comprising the steps of:
   conveying a plurality of articles in a forward direction and a lateral direction on an upstream conveyor including a low friction conveying surface;
   conveying said articles along a first sidewall extending outwardly along an inward side edge of said upstream conveyor at a selected position for a selected length;
   conveying said articles in a forward direction and a lateral direction along an intermediate conveyor having a low friction conveying surface in flow communication with said upstream conveyor, said intermediate conveyor having a narrower width than said upstream conveyor;
conveying said articles along a second sidewall extending along an inward side edge of said intermediate conveyor;
conveying said articles along an offset extending inwardly from said first sidewall toward said second sidewall;
conveying said articles along a raised high friction belt of a selected width extending along an outer edge of said intermediate conveyor opposite of and parallel to said second sidewall said high friction belt raised a selected height above the surface of said low friction conveying surface of said intermediate conveyor holding said article coming in contact with said high friction belt preventing a lateral shift toward said inward offset and said second sidewall, said high friction belt raised an effective height and having an effective width to create a tipover threshold for said articles having a portion extending over both sides of said high friction belt and a center of gravity extending over a portion of said high friction belt opposite said second sidewall for tipping over and removing said articles from said intermediate conveyor.

2. The method of shifting, holding, and removing said articles from said conveying apparatus of claim 1, further comprising the step of conveying said articles having a width less than the width of said intermediate conveyor and not engaging said high friction belt toward a downstream conveyor in flow communication therewith, said downstream conveyor having a narrower width than said intermediate conveyor presenting a tip over threshold for said articles having a width greater than said downstream conveyor removing packages which have a center of gravity extending over an outer edge of said downstream conveyor.

3. The method of shifting, holding, and removing said articles from said conveying apparatus of claim 2, whereby said downstream conveyor is selected from the group consisting of a singulator conveyor, a side by side eliminator conveyor, and a plurality of driven skewed rollers having rotary axes skewed relative to a longitudinal direction of travel for moving articles forward and laterally.

4. The method of shifting, holding, and removing said oversize articles from said conveying apparatus of claim 1, said low friction conveying surface of said upstream conveyor and said low friction conveying surface of said intermediate conveyor comprising a plurality of driven skewed rollers having rotary axes skewed relative to a longitudinal direction of travel for moving articles forward and laterally.

5. The method of shifting, holding, and removing said articles from said conveying apparatus of claim 2, wherein said high friction conveying surface of said downstream conveyor comprises a belt selected from the group consisting of a rubber, an elastomer, a polymer, and combinations thereof.

6. The method of shifting, holding, and removing said articles from said conveying apparatus of claim 4, wherein said low friction conveying surface is composed of a material selected from the group consisting of an aluminum, a stainless steel, a steel, a TEFLON material, a NYLON material, a graphite material, a polymeric material, and combinations thereof.

7. The method of shifting, holding, and removing said articles from said conveying apparatus of claim 4, including the step of conveying said articles on said low friction conveying surface comprising a plastic modular belting, a belt, a belt coated with a low friction coating, a roller coated with a low friction coating, and combinations thereof.

8. A method of shifting, holding and removing articles from a shift and hold conveying apparatus comprising an upstream conveyor including a low friction conveying surface comprising a plurality of driven skewed rollers having rotary axes skewed relative to a longitudinal direction of travel for conveying a plurality of articles in a forward direction and a lateral direction, a first sidewall extending outwardly along an inward side edge of said upstream conveyor in flow communication with an intermediate conveyor including a low friction conveying surface comprising a plurality of driven skewed rollers having rotary axes skewed relative to a longitudinal direction of travel for conveying a plurality of articles in a forward direction and a lateral direction, said intermediate conveyor having a narrower width than said upstream conveyor, a second lateral sidewall extending along an inward side edge of said intermediate conveyor, an inward offset extending from said first sidewall toward said second sidewall, and a raised belt having a high friction conveying surface of a selected width and height extending along an outer edge of said intermediate conveyor parallel to and opposing said second sidewall and said inward offset raised a selected height above said low friction conveying surface of said intermediate conveyor and in flow communication therewith, said high friction belt raised an effective height and having an effective width to create a tipover threshold for articles having a portion extending over both sides of said high friction belt and a center of gravity extending over a portion of said high friction belt opposite said second sidewall will tip over and be removed from said intermediate conveyor and not shift toward said second side wall, the method comprising the steps of:
conveying said articles in a forward direction and a lateral direction on said upstream conveyor including a low friction conveying surface along said first sidewall;
conveying said articles over said intermediate conveyor and along said inward offset and said second sidewall extending along an inward side edge of said intermediate conveyor shifting said articles along said inward offset extending from said first sidewall toward said second sidewall; and
conveying said articles having a portion extending along an outward edge of said intermediate conveyor over a raised high friction belt of a selected width extending along an outer edge of said intermediate conveyor opposing said second sidewall raised a selected height above said low friction conveying surface and in flow communication therewith, said raised high friction belt forming a tip-over threshold removing said articles having a portion extending over both sides of said high friction belt and a center of gravity extending over a portion of said high friction belt opposite said second sidewall will tip over and be removed from said intermediate conveyor and not shift toward said second side wall.

9. A method of shifting, holding and removing an article from a conveying apparatus comprising the steps of:
conveying an article toward a first sidewall on an upstream conveyor having a lower friction conveying surface comprising a plurality of driven skewed rollers having rotary axes skewed relative to a longitudinal direction of travel for moving said articles forward and laterally, said first sidewall extending outwardly along an inward side edge of said upstream conveyor for a selected length;

conveying said article along an intermediate conveyor in flow communication with said upstream conveyor, said intermediate conveyor having a low friction conveying surface comprising a plurality of driven skewed rollers having rotary axes skewed relative to a longitudinal direction of travel for moving said articles forward and laterally, said intermediate conveyor having a narrower width than said upstream conveyor; and conveying and shifting said articles along an inward offset extending from said first sidewall toward a second sidewall adjacent said intermediate conveyor, said second sidewall extending along an inward side edge of said intermediate conveyor said intermediate conveyor including a raised high friction belt of a selected width extending along an outer edge of said intermediate conveyor opposite and parallel to said inward offset and said second sidewall, said high friction belt raised a selected height above the surface of said low friction conveying surface of said intermediate conveyor for preventing said article coming in contact with said high friction belt from shifting laterally toward said inward offset and said second sidewall, said high friction belt raised an effective height and having an effective width to create a tipover threshold for packages having a portion extending over both sides of said high friction belt and a center of gravity extending over a portion of said high friction belt opposite said second sidewall will tip over and be removed from said intermediate conveyor and not shift toward said second side wall.

10. The method of shifting, holding and removing an article from a conveying apparatus of claim 9, further comprising the step of conveying said article having a width less than the width of said intermediate conveyor and not engaging said high friction belt are conveyed toward a downstream conveyor in flow communication therewith, said downstream conveyor having a narrower width than said intermediate conveyor presenting a tip over threshold for said article having a width greater than said downstream conveyor in order to remove packages which have a center of gravity extending over an outer edge of said downstream conveyor.

11. The method of shifting, holding and removing an article from a conveying apparatus of claim 9, further comprising the step of conveying said articles along said downstream conveyor comprising a side by side eliminator conveyor.

12. The method of shifting, holding, and removing an article from said conveying apparatus of claim 9, wherein said downstream conveyor comprises a singulator conveyor.

13. The method of shifting, holding, and removing an article from said conveying apparatus of claim 9, wherein said downstream conveyor includes a higher friction conveying surface.

14. The method of shifting, holding, and removing an article from said conveying apparatus of claim 13, wherein said higher friction conveying surface of said downstream conveyor comprise a belt.

15. The method of shifting, holding, and removing an article from said conveying apparatus of claim 13, wherein said higher friction conveying surface is selected from the group consisting of a rubber, an elastomer, a polymer, and combinations thereof.

16. The method of shifting, holding, and removing an article from said conveying apparatus of claim 13, wherein said downstream conveyor includes a lower friction conveying surface comprising a plurality of driven rollers having rotary axes skewed relative to a longitudinal direction of travel for moving articles forward and laterally.

17. The method of shifting, holding, and removing an article from said conveying apparatus of claim 9, wherein said width of said downstream conveyor is less than one-half the width of said intermediate conveyor.

18. The method of shifting, holding, and removing an article from said conveying apparatus of claim 9, wherein said high friction raised belt runs at a selected faster, slower, or same speed as a vector speed of said intermediate conveyor conveying surface in the primary flow direction.

19. The method of shifting, holding, and removing an article from said conveying apparatus of claim 9, wherein said high friction raised belt extends to a selected height selected from the group consisting of up to five inches, up to three inches, from ⅛ to two inches, from ½ to two inches, and from about ½ to one inch to contact and hold packages resting on the belt and adjacent conveying surface.

20. The method of shifting, holding, and removing said articles from said conveying apparatus of claim 2, wherein said width of said downstream conveyor is less than one-half the width of said intermediate conveyor.

21. The method of shifting, holding, and removing said articles from said conveying apparatus of claim 2, wherein said high friction raised belt runs at a selected faster, slower, or same speed as a vector speed of said intermediate conveyor in the primary flow direction.

22. The method of shifting, holding, and removing said articles from said conveying apparatus of claim 2, wherein said high friction raised belt extends to a selected height selected from the group consisting of up to five inches, up to three inches, from ⅛ to two inches, from ½ to two inches, and from about ½ to one inch to contact and hold packages resting on the belt and adjacent conveying surface.

23. The method of shifting, holding, and removing articles from the conveying apparatus of claim 8, including a downstream conveyor in flow communication with said intermediate conveyor, said downstream conveyor having a narrower width than said intermediate conveyor presenting a tip over threshold for said articles having a width greater than said downstream conveyor in order to remove packages which have a center of gravity extending over an outer edge of said downstream conveyor.

24. The method of shifting, holding and removing articles from the conveying apparatus of claim 23, wherein said downstream conveyor is selected from the group consisting of a singulator and a side by side eliminator conveyor.

* * * * *